US012000380B2

(12) United States Patent
Vita et al.

(10) Patent No.: US 12,000,380 B2
(45) Date of Patent: Jun. 4, 2024

(54) WIND TURBINE CONTROL

(71) Applicant: General Electric Renovables Espana, S.L., Barcelona (ES)

(72) Inventors: Luca Vita, Barcelona (ES); Pedro Arroyo Beltri, Barcelona (ES); Carmen Ruiz Garrido, Madrid (ES)

(73) Assignee: General Electric Renovables Espana, S.L., Barcelona (ES)

( * ) Notice: Subject to any disclaimer, the term of this patent is extended or adjusted under 35 U.S.C. 154(b) by 0 days.

(21) Appl. No.: 18/311,523

(22) Filed: May 3, 2023

(65) Prior Publication Data

US 2023/0358210 A1 Nov. 9, 2023

(30) Foreign Application Priority Data

May 4, 2022 (EP) .................................. 22382427

(51) Int. Cl.
*F03D 7/02* (2006.01)
(52) U.S. Cl.
CPC .... *F03D 7/0224* (2013.01); *F05B 2270/1033* (2013.01); *F05B 2270/32* (2013.01); *F05B 2270/321* (2013.01)
(58) Field of Classification Search
CPC .. F03D 7/0224; F03D 7/0256; F05B 2270/32; F05B 2270/321
See application file for complete search history.

(56) References Cited

U.S. PATENT DOCUMENTS

| | | | |
|---|---|---|---|
| 8,247,913 B2 | 8/2012 | von Mutius et al. | |
| 8,301,310 B2 | 10/2012 | Nim | |
| 9,366,235 B2 | 6/2016 | Evans | |
| 9,644,610 B2 | 5/2017 | Dalsgaard et al. | |
| 9,841,006 B2 | 12/2017 | Creaby et al. | |
| 10,107,259 B2 | 10/2018 | Kristoffersen et al. | |
| 10,502,185 B2 | 12/2019 | Beekmann et al. | |
| 10,662,924 B2 | 5/2020 | Caponetti et al. | |

(Continued)

FOREIGN PATENT DOCUMENTS

| | | |
|---|---|---|
| CN | 109653945 A | 4/2019 |
| EP | 2665928 A1 | 11/2013 |

(Continued)

OTHER PUBLICATIONS

European Search Report Corresponding to EP22382427.7 dated Nov. 9, 2022.

*Primary Examiner* — Justin D Seabe
*Assistant Examiner* — John S Hunter, Jr.
(74) *Attorney, Agent, or Firm* — Dority & Manning, P.A.

(57) ABSTRACT

A method for controlling a wind turbine, and an associated wind turbine, includes receiving a wind direction signal indicative of an instantaneous wind direction at the wind turbine and receiving a signal indicative of an instantaneous wind speed at the wind turbine. A rate of change of the wind direction at the wind turbine and a rate of change of wind speed at the wind turbine are determined. A control signal for a pitch system for blades of the wind turbine is determined based on the rate of change of the wind direction and the rate of change of wind speed. The pitch of the blades is then changed with the pitch system based on the control signal to reduce loads on the wind turbine from changes in the wind direction simultaneous with changes in the wind speed.

20 Claims, 6 Drawing Sheets

(56) References Cited

U.S. PATENT DOCUMENTS

| | | |
|---|---|---|
| 10,677,220 B2 | 6/2020 | Baba et al. |
| 11,041,483 B2 * | 6/2021 | Tomas .................... F03D 17/00 |
| 2019/0178231 A1 * | 6/2019 | Tomas ..................... F03D 7/02 |
| 2020/0217298 A1 | 7/2020 | Niss |
| 2020/0271096 A1 | 8/2020 | Ou et al. |
| 2021/0180565 A1 | 6/2021 | Harms et al. |
| 2022/0299007 A1 * | 9/2022 | Namura ................ F03D 7/0288 |

FOREIGN PATENT DOCUMENTS

| | | |
|---|---|---|
| EP | 2583125 B1 | 1/2015 |
| EP | 2112373 B1 | 11/2015 |
| EP | 2795109 B1 | 6/2017 |
| EP | 2788620 B1 | 10/2017 |
| EP | 3071831 B1 | 8/2018 |
| EP | 2022981 B1 | 9/2018 |
| EP | 3199806 B1 | 4/2019 |
| EP | 3680479 B1 | 6/2021 |
| WO | WO2012/097814 A1 | 7/2012 |
| WO | WO2021039188 A1 | 3/2021 |

* cited by examiner

WIND TURBINE CONTROL

The present disclosure relates to wind turbines, and more particularly relates to methods and systems for controlling and operating wind turbines. The present disclosure specifically relates to methods and system for controlling and operating wind turbines in extreme wind conditions.

BACKGROUND

Modern wind turbines are commonly used to supply electricity into the electrical grid. Wind turbines of this kind generally comprise a tower and a rotor arranged on the tower. The rotor, which typically comprises a hub and a plurality of blades, is set into rotation under the influence of the wind on the blades. The rotation generates a torque that is normally transmitted through a rotor shaft to a generator, either directly or through a gearbox. This way, the generator produces electricity which can be supplied to the electrical grid.

The wind turbine hub may be rotatably coupled to a front of the nacelle. The wind turbine hub may be connected to a rotor shaft, and the rotor shaft may then be rotatably mounted in the nacelle using one or more rotor shaft bearings arranged in a frame inside the nacelle. The nacelle is a housing arranged on top of a wind turbine tower that contains and protects e.g. the gearbox (if present) and the generator and, depending on the wind turbine, further components such as a power converter, and auxiliary systems.

A wind turbine further typically comprises a wind turbine controller. The wind turbine controller may be configured to determine suitable actuator setpoints for the wind turbine based on the prevailing circumstances. The actuator setpoints for modern variable speed wind turbines include e.g. the generator torque and the pitch angle of the blades. Through control of the pitch angle(s) of the blade(s) and the generator torque, the speed of the rotor may be controlled, as well as the electrical power output, aerodynamic thrust and further mechanical loads. The purpose of the control system is generally to maximize electrical power output while at the same time keeping loads in the wind turbine at an acceptable level.

Normal or standard operation of a wind turbine may generally be along a predefined power curve, which prescribes the operation of the wind turbine as a function of the prevailing wind speed. Normal operation includes different operational ranges. In lower wind speed ranges, the objective is generally to maximize electrical power output. In higher wind speed ranges, particularly wind speeds above nominal wind speed, the operation of the wind turbine is focused on keeping loads under control, while maintaining electrical power output at a predetermined level.

As noted before, the wind turbine controller may send actuator setpoints of torque and pitch (but also of other actuators such as yaw) and these may be changed in accordance with circumstances. Such circumstances may include e.g. the average wind speed, turbulence, wind shear, air density and other meteorological conditions but also internal conditions like vibrations, mechanical loading or component temperatures etc. The circumstances may also include specific external demands to reduce noise, an interruption of operation for maintenance, grid based situations of e.g. demand of reduction of active power, or a grid event such as a low voltage event, a zero voltage event, an increase in grid frequency or other.

The wind turbine controller may be programmed to, based on a set of measured variables received from a variety of sensors, send signals to various systems (such as e.g. the generator, the pitch system and a yaw system) to influence the operation of the wind turbine. The sensors may include rotor speed sensor, load sensors (strain gauges or accelerometers), anemometer, weathervane, and others.

Both wind speed and wind direction may continuously vary during operation of a wind turbine. The wind turbine control system may react to such changes by changing the setpoints or other control signals for different actuators. In general, in wind turbine control design there is a desire to find a balance between a very responsive wind turbine control system (which reacts to very small changes and can lead to undue wear of actuators) and a wind turbine control system that reacts too slowly (which can lead to unfavorable load scenarios and inefficient operation with less electrical power production).

A particularly complicated scenario of wind conditions is the combination of a change in wind speed, particularly a quick increase of wind speed, and a change in wind direction at the same time. Normal wind turbine operation can lead to undesirably high loads in such a scenario.

SUMMARY

In an aspect of the present disclosure, a method is provided which comprises receiving a wind direction signal indicative of an instantaneous wind direction at a wind turbine and receiving one or more signals indicative of an instantaneous wind speed at the wind turbine. The method further comprises determining a rate of change of the wind direction at the wind turbine and an indication of a rate of change of wind speed at the wind turbine and determining one or more control signals for a pitch system of the wind turbine at least partially based on the determined rate of change of the wind direction and the determined indication of the rate of change of wind speed.

In accordance with this aspect, a method for controlling a wind turbine is provided which is particularly suitable for dealing with extreme wind conditions such as a combination of a change in wind direction and an increase in wind speed. A change in wind direction leads to instantaneous misalignment of the wind turbine rotor with a wind direction. Even though this can lead to a reduction of rotor speed or a perceived reduction of wind speed, it can also lead to an increase in loads on the wind turbine. By monitoring both a rate of change of wind direction and an indication of a rate of change of wind speed, the wind turbine can be effectively controlled to avoid such high loads. At the same time, unnecessarily reducing loads and power output can be avoided.

Throughout the present disclosure, a "rate of change" may be regarded as a first order time derivative of a variable or operational parameter. The variable or operational parameter may particularly be one of rotor speed, wind speed, and wind direction.

In a further aspect, a control system for a wind turbine is provided, which is configured to receive a wind direction signal indicative of an instantaneous wind direction at a wind turbine and to receive one or more signals indicative of an instantaneous wind speed at the wind turbine. The control system is further configured to determine a rate of change of the wind direction at the wind turbine and an indication of a rate of change of wind speed at the wind turbine and to determine one or more control signals for a pitch system of the wind turbine at least partially based on the determined rate of change of the wind direction and on the determined indication of the rate of change of wind speed.

In yet a further aspect, a method for operating a wind turbine is provided. The method comprises measuring a wind direction at a wind turbine and determining a rate of change of the wind direction at the wind turbine and determining a rate of change of a wind speed or rotor speed at the wind turbine. The method further comprises reducing loads on the wind turbine when the rate of change of the wind speed or rotor speed is above an acceleration threshold, the acceleration threshold being based at least partially on the rate of change of the wind direction.

DETAILED DESCRIPTION OF EXAMPLES

Figure 1:
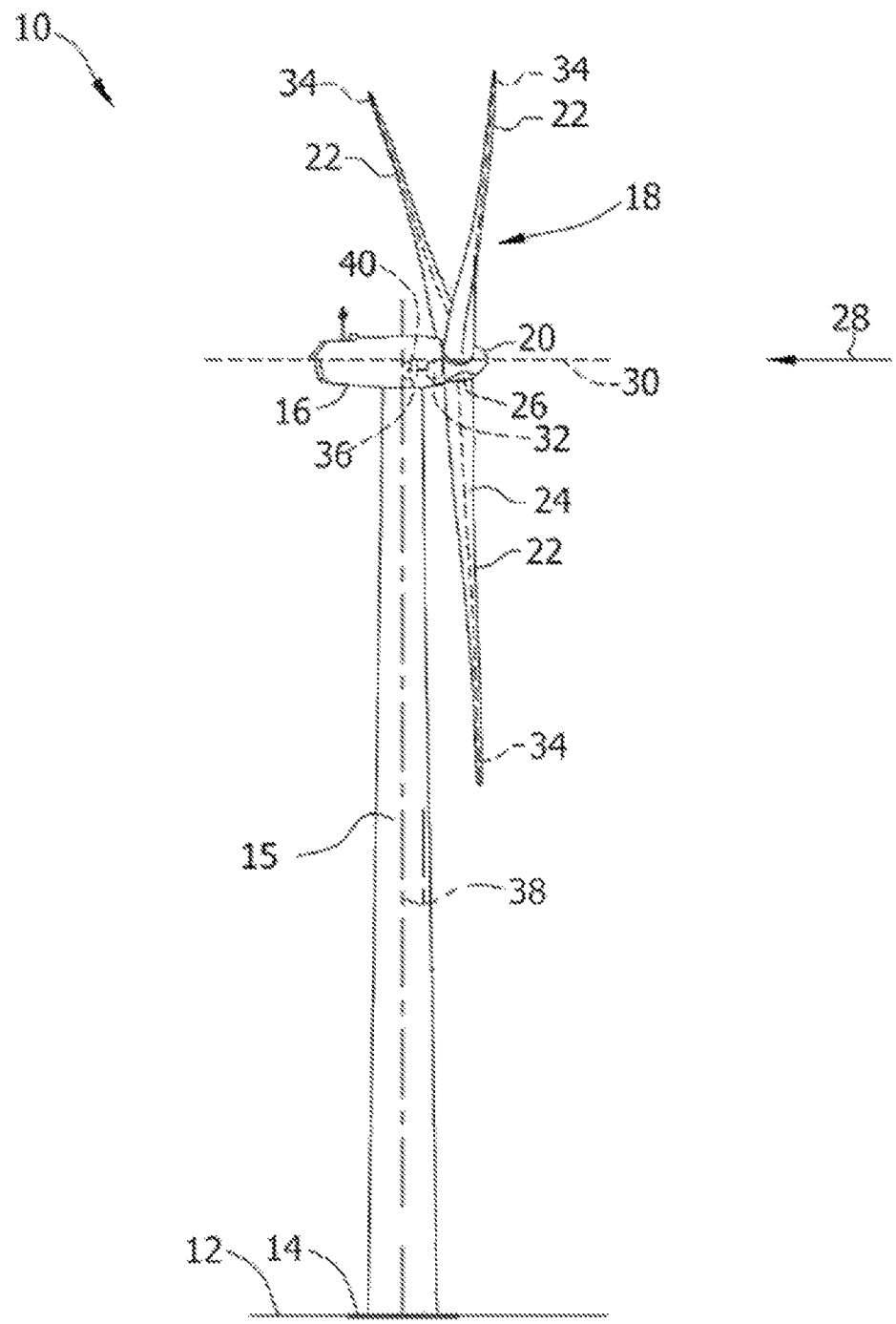
FIG. 1 schematically illustrates a perspective view of one example of a wind turbine.

Reference now will be made in detail to embodiments of the invention, one or more examples of which are illustrated in the drawings. Each example is provided by way of explanation of the invention, not as a limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 is a perspective view of an example of a wind turbine 10. In the example, the wind turbine 10 is a horizontal-axis wind turbine. Alternatively, the wind turbine 10 may be a vertical-axis wind turbine. In the example, the wind turbine 10 includes a tower 100 that extends from a support system 14 on a ground 12, a nacelle 16 mounted on tower 100, and a rotor 18 that is coupled to nacelle 16. The rotor 18 includes a rotatable hub 20 and at least one rotor blade 22 coupled to and extending outward from the hub 20. In the example, the rotor 18 has three rotor blades 22. In an alternative embodiment, the rotor 18 includes more or less than three rotor blades 22. The tower 100 may be fabricated from tubular steel to define a cavity (not shown in FIG. 1) between a support system 14 and the nacelle 16. In an alternative embodiment, the tower 100 is any suitable type of a tower having any suitable height. According to an alternative, the tower can be a hybrid tower comprising a portion made of concrete and a tubular steel portion. Also, the tower can be a partial or full lattice tower.

The rotor blades 22 are spaced about the hub 20 to facilitate rotating the rotor 18 to enable kinetic energy to be transferred from the wind into usable mechanical energy, and subsequently, electrical energy. The rotor blades 22 are mated to the hub 20 by coupling a blade root portion 24 to the hub 20 at a plurality of load transfer regions 26. The load transfer regions 26 may have a hub load transfer region and a blade load transfer region (both not shown in FIG. 1). Loads induced on the rotor blades 22 are transferred to the hub 20 via the load transfer regions 26.

In examples, the rotor blades 22 may have a length ranging from about 15 meters (m) to about 90 m or more. Rotor blades 22 may have any suitable length that enables the wind turbine 10 to function as described herein. For example, non-limiting examples of blade lengths include 20 m or less, 37 m, 48.7 m, 50.2 m, 52.2 m or a length that is greater than 91 m. As wind strikes the rotor blades 22 from a wind direction 28, the rotor 18 is rotated about a rotor axis 30. As the rotor blades 22 are rotated and subjected to centrifugal forces, the rotor blades 22 are also subjected to various forces and moments. As such, the rotor blades 22 may deflect and/or rotate from a neutral, or non-deflected, position to a deflected position.

Moreover, a pitch angle of the rotor blades 22, i.e., an angle that determines an orientation of the rotor blades 22 with respect to the wind direction, may be changed by a pitch system 32 to control the load and power generated by the wind turbine 10 by adjusting an angular position of at least one rotor blade 22 relative to wind vectors. Pitch axes 34 of rotor blades 22 are shown. During operation of the wind turbine 10, the pitch system 32 may particularly change a pitch angle of the rotor blades 22 such that the angle of attack of (portions of) the rotor blades are reduced, which facilitates reducing a rotational speed and/or facilitates a stall of the rotor 18.

In the example, a blade pitch of each rotor blade 22 is controlled individually by a wind turbine controller 36 or by a pitch control system 80. Alternatively, the blade pitch for all rotor blades 22 may be controlled simultaneously by said control systems.

Further, in the example, as the wind direction 28 changes, a yaw direction of the nacelle 16 may be rotated about a yaw axis 38 to position the rotor blades 22 with respect to wind direction 28.

In the example, the wind turbine controller 36 is shown as being centralized within the nacelle 16, however, the wind turbine controller 36 may be a distributed system throughout the wind turbine 10, on the support system 14, within a wind farm, and/or at a remote control center. The wind turbine controller 36 includes a processor 40 configured to perform the methods and/or steps described herein. Further, many of the other components described herein include a processor.

As used herein, the term "processor" is not limited to integrated circuits referred to in the art as a computer, but broadly refers to a controller, a microcontroller, a microcomputer, a programmable logic controller (PLC), an application specific, integrated circuit, and other programmable circuits, and these terms are used interchangeably herein. It should be understood that a processor and/or a control system can also include memory, input channels, and/or output channels.

Figure 2:
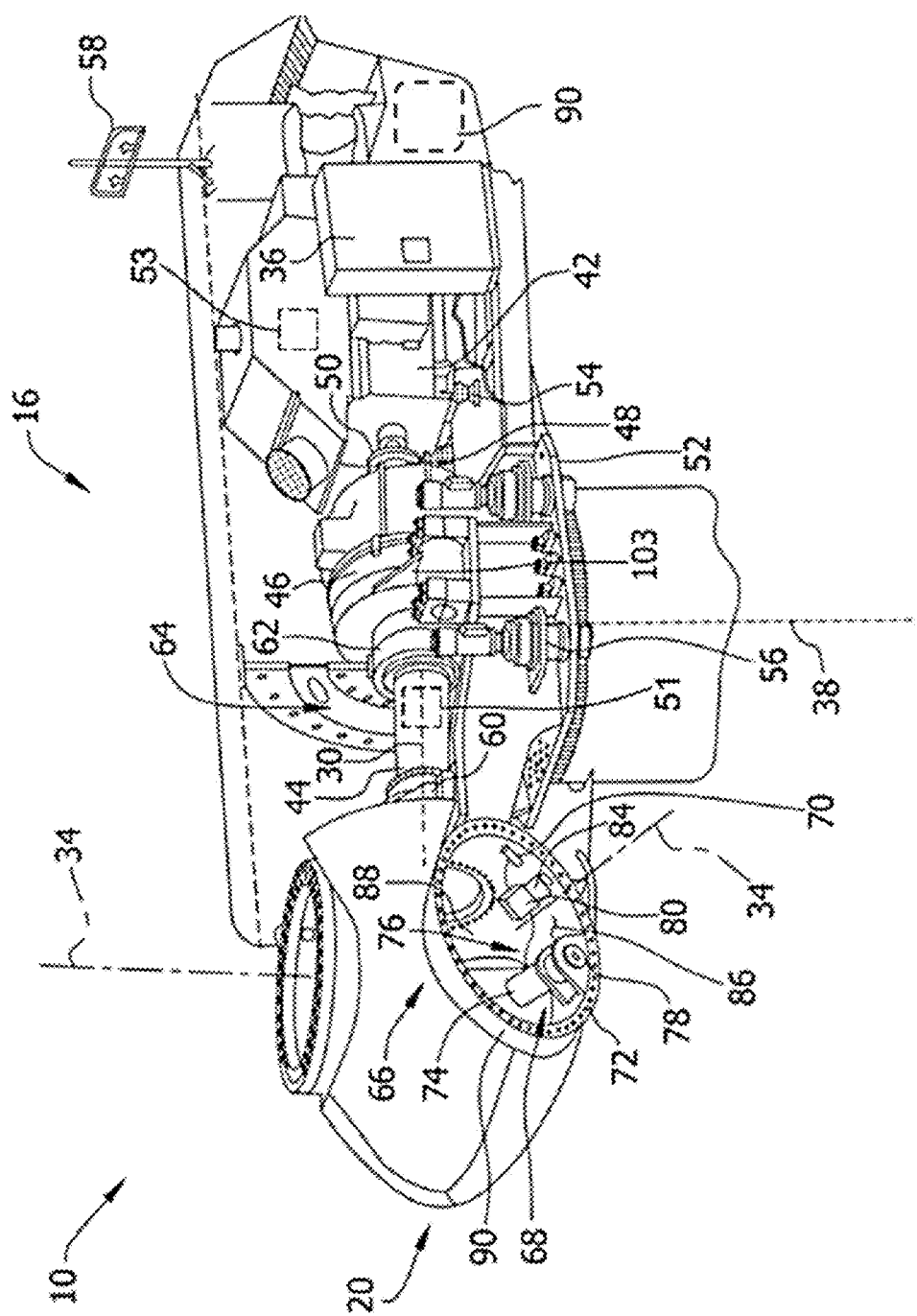
FIG. 2 illustrates a simplified, internal view of one example of the nacelle of the wind turbine of FIG. 1.

FIG. 2 is an enlarged sectional view of a portion of the wind turbine 10. In the example, the wind turbine 10 includes the nacelle 16 and the rotor 18 that is rotatably coupled to the nacelle 16. More specifically, the hub 20 of the rotor 18 is rotatably coupled to an electric generator 42 positioned within the nacelle 16 by the main shaft 44, a gearbox 46, a high-speed shaft 48, and a coupling 50. In the example, the main shaft 44 is disposed at least partially coaxial to a longitudinal axis (not shown) of the nacelle 16. A rotation of the main shaft 44 drives the gearbox 46 that subsequently drives the high-speed shaft 48 by translating the relatively slow rotational movement of the rotor 18 and of the main shaft 44 into a relatively fast rotational movement of the high-speed shaft 48. The latter is connected to the generator 42 for generating electrical energy with the help of a coupling 50. Furthermore, a transformer 90 and/or suitable electronics, switches, and/or inverters may be arranged in the nacelle 16 in order to transform electrical energy generated by the generator 42 having a voltage between 400V to 1000 V into electrical energy having medium voltage (10-35 KV). Said electrical energy is conducted via power cables 160 from the nacelle 16 into the tower 100.

The gearbox 46, generator 42 in transformer 90 may be supported by a main support structure frame of the nacelle 16, optionally embodied as a main frame 52. The gearbox 46 may include a gearbox housing that is connected to the main frame 52 by one or more torque arms 103. In the example, the nacelle 16 also includes a main forward support bearing 60 and a main aft support bearing 62. Furthermore, the generator 42 can be mounted to the main frame 52 by decoupling support means 54, in particular in order to prevent vibrations of the generator 42 to be introduced into the main frame 52 and thereby causing a noise emission source.

Optionally, the main frame 52 is configured to carry the entire load caused by the weight of the rotor 18 and components of the nacelle 16 and by the wind and rotational loads, and furthermore, to introduce these loads into the tower 100 of the wind turbine 10. The rotor shaft 44, generator 42, gearbox 46, high speed shaft 48, coupling 50, and any associated fastening, support, and/or securing device including, but not limited to, support 52, and forward support bearing 60 and aft support bearing 62, are sometimes referred to as a drive train 64.

The nacelle 16 also may include a yaw drive mechanism 56 that may be used to rotate the nacelle 16 and thereby also the rotor 18 about the yaw axis 38 to control the perspective of the rotor blades 22 with respect to the wind direction 28.

For positioning the nacelle 16 appropriately with respect to the wind direction 28, the nacelle 16 may also include at least one meteorological measurement system which may include a wind vane and anemometer. The meteorological measurement system 58 can provide information to the wind turbine controller 36 that may include wind direction 28 and/or wind speed. In the example, the pitch system 32 is at least partially arranged as a pitch assembly 66 in the hub 20. The pitch assembly 66 includes one or more pitch drive systems 68 and at least one sensor 70. Each pitch drive system 68 is coupled to a respective rotor blade 22 (shown in FIG. 1) for modulating the pitch angle of a rotor blade 22 along the pitch axis 34. Only one of three pitch drive systems 68 is shown in FIG. 2.

In the example, the pitch assembly 66 includes at least one pitch bearing 72 coupled to hub 20 and to a respective rotor blade 22 (shown in FIG. 1) for rotating the respective rotor blade 22 about the pitch axis 34. The pitch drive system 68 includes a pitch drive motor 74, a pitch drive gearbox 76, and a pitch drive pinion 78. The pitch drive motor 74 is coupled to the pitch drive gearbox 76 such that the pitch drive motor 74 imparts mechanical force to the pitch drive gearbox 76. The pitch drive gearbox 76 is coupled to the pitch drive pinion 78 such that the pitch drive pinion 78 is rotated by the pitch drive gearbox 76. The pitch bearing 72 is coupled to pitch drive pinion 78 such that the rotation of the pitch drive pinion 78 causes a rotation of the pitch bearing 72.

Pitch drive system 68 is coupled to the wind turbine controller 36 for adjusting the pitch angle of a rotor blade 22 upon receipt of one or more signals from the wind turbine controller 36. In the example, the pitch drive motor 74 is any suitable motor driven by electrical power and/or a hydraulic system that enables pitch assembly 66 to function as described herein. Alternatively, the pitch assembly 66 may include any suitable structure, configuration, arrangement, and/or components such as, but not limited to, hydraulic cylinders, springs, and/or servomechanisms. In certain embodiments, the pitch drive motor 74 is driven by energy extracted from a rotational inertia of hub 20 and/or a stored energy source (not shown) that supplies energy to components of the wind turbine 10.

The pitch assembly 66 may also include one or more pitch control systems 80 for controlling the pitch drive system 68 according to control signals from the wind turbine controller 36, in case of specific prioritized situations and/or during rotor 18 overspeed. In the example, the pitch assembly 66 includes at least one pitch control system 80 communicatively coupled to a respective pitch drive system 68 for controlling pitch drive system 68 independently from the wind turbine controller 36. In the example, the pitch control system 80 is coupled to the pitch drive system 68 and to a sensor 70. During normal operation of the wind turbine 10, the wind turbine controller 36 may control the pitch drive system 68 to adjust a pitch angle of rotor blades 22.

According to an embodiment, a power generator 84, for example comprising a battery and electric capacitors, is arranged at or within the hub 20 and is coupled to the sensor 70, the pitch control system 80, and to the pitch drive system 68 to provide a source of power to these components. In the example, the power generator 84 provides a continuing source of power to the pitch assembly 66 during operation of the wind turbine 10. In an alternative embodiment, power source 84 provides power to the pitch assembly 66 only during an electric power loss event of the wind turbine 10. The electric power loss event may include power grid loss or dip, malfunctioning of an electrical system of the wind turbine 10, and/or failure of the wind turbine controller 36. During the electric power loss event, the power generator 84 operates to provide electric power to the pitch assembly 66 such that pitch assembly 66 can operate during the electric power loss event.

In the example, the pitch drive system 68, the sensor 70, the pitch control system 80, cables, and the power generator 84 are each positioned in a cavity 86 defined by an inner surface 88 of hub 20. In an alternative embodiment, said components are positioned with respect to an outer surface of hub 20 and may be coupled, directly or indirectly, to outer surface.

Figure 3A:
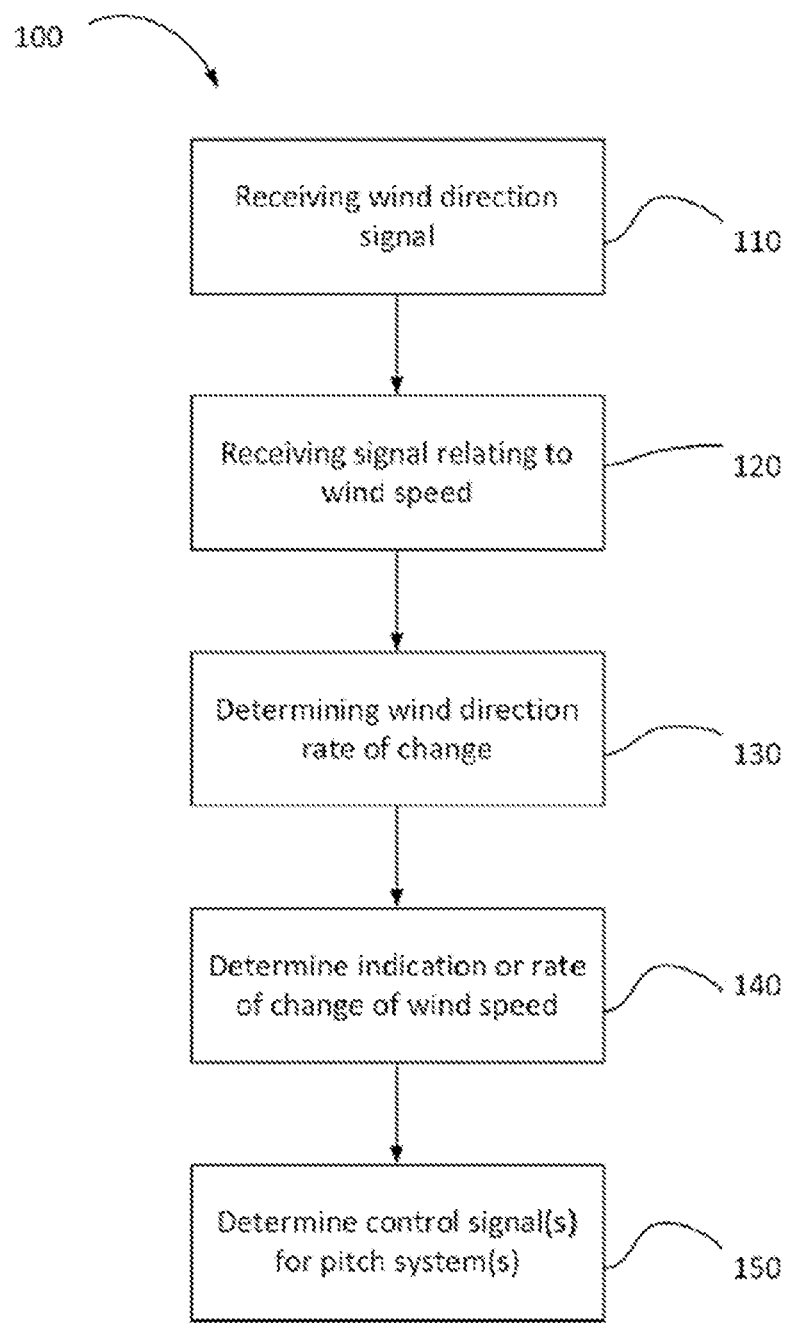
FIG. 3A illustrates a first example of a control method for a wind turbine controller according to the present disclosure.

FIG. 3A illustrates an example of a method 100 for controlling a wind turbine. The method comprises, at block 110, receiving a wind direction signal indicative of an instantaneous wind direction at the wind turbine and, at block 120, receiving one or more signals indicative of an instantaneous wind speed at the wind turbine. The method 100 further comprises, at blocks 130 and 140, determining a rate of change of the wind direction at the wind turbine and an indication of a rate of change of wind speed at the wind turbine. The method further comprises, at block 150, determining one or more control signals for a pitch system of the wind turbine at least partially based on the determined rate of change of the wind direction and the determined indication of the rate of change of wind speed.

Such a method 100 may be carried out by a wind turbine control system, e.g. wind turbine controller 36 as previously mentioned with reference to FIGS. 1 and 2.

Even though the blocks have been illustrated in a specific order, it should be clear that the order of some of the blocks (and the method steps) may be interchanged and that some of the blocks (and method steps) may be carried out substantially at the same time. It should also be clear that the method may be carried out substantially continuously throughout operation of the wind turbine. A frequency of measurement and processing may be e.g. between 0.1 HZ and 20 Hz.

With reference to the individual blocks of FIG. 3A: At block 110, a wind direction signal may be received. The wind direction signal may be received e.g. from a meteorological mast, a wind vane mounted on the nacelle, a neighboring wind turbine, or a LIDAR or SODAR arranged at or near the wind turbine.

The wind direction signal may in some examples be a yaw misalignment signal. I.e. a yaw misalignment may be derived from wind vane measurements and/or load measurements (e.g. loads on the yaw system) and based on the perceived misalignment, a wind direction may be determined. An absolute value of a wind direction may not be necessary, and rather a relative value of a wind direction, or a rate of change of the wind direction may be sufficient.

At block 120, a signal relating to the wind speed may be a direct wind measurement. In some examples, the signals indicative of an instantaneous wind speed are derived from a nacelle mounted wind measurement system e.g. from a nacelle mounted anemometer. Alternatively, a LIDAR or SODAR or a wind speed measurement system arranged in a wind farm, e.g. in a neighboring wind turbine, may be used. Alternatively to measuring wind speed, rotor speed may be measured. Rotor speed may be regarded as an indicator of wind speed. In some examples, a wind turbine rotor speed may be measured directly, or a generator rotor speed may be measured.

In some examples, the signals indicative of the instantaneous wind speed are rotor speed measurements. In some examples, the signals indicative of the instantaneous wind speed may be derived from a power output of the wind turbine and a pitch angle of the blades. In particular, from the combination of rotor speed, pitch angle and power output, an indication of wind speed may be derived.

At block 140, an indication of a rate of change of wind speed may be determined. This may be e.g. wind acceleration and/or rotor speed acceleration.

At block 150, one or more control signals for one or more pitch systems may be determined and may be sent to these pitch control systems. The control signal(s) for the pitch system(s) may include a specific pitch rate. The pitch rate may be higher than a "standard" pitch rate. A standard pitch rate may herein be regarded as a pitch rate used for adjusting blades to varying wind conditions in normal, standard operation i.e. operation according to a steady state power curve (in the absence of grid events, setpoint reductions, specific high load cases and other exceptional circumstances).

When a combination of a changing wind direction and increasing wind speed is detected, the loads on a wind turbine may need to be decreased more rapidly than usual. The pitch rate may thus be higher than normal. The pitch rate may herein be regarded as a positive pitch rate i.e. a rotation of the blades to reduce their angle of attack and generate less left.

Activating the pitch control system to reduce loads on the blades may lead to a decrease in rotor speed and a reduced power output.

For example, IEC 64100 (an International Standard published by the International Electrotechnical Commission regarding wind turbines), which is in force in April 2022 describes a Design Load Case 1.4. Design Load case 1.4 is a combination of an increase in wind speed, and a simultaneous change in wind direction of up to 60°. In such a scenario, the loads on the blades and tower can significantly and rapidly increase. In control strategies that do not take such a scenario into account, the onset of a change in wind direction may actually lead to a decrease of the pitch angle because a rotor speed deceleration might be first noted. In "normal" or standard operation according to a steady state power curve, a rotor speed deceleration might provoke a decrease of pitch angle or a reduction in generator torque in order to attempt to maintain rotor speed. If in reality a wind gust or relatively rapid wind speed increase occurs, the loads on wind turbine components can reach levels that are higher than acceptable.

Figure 3B:
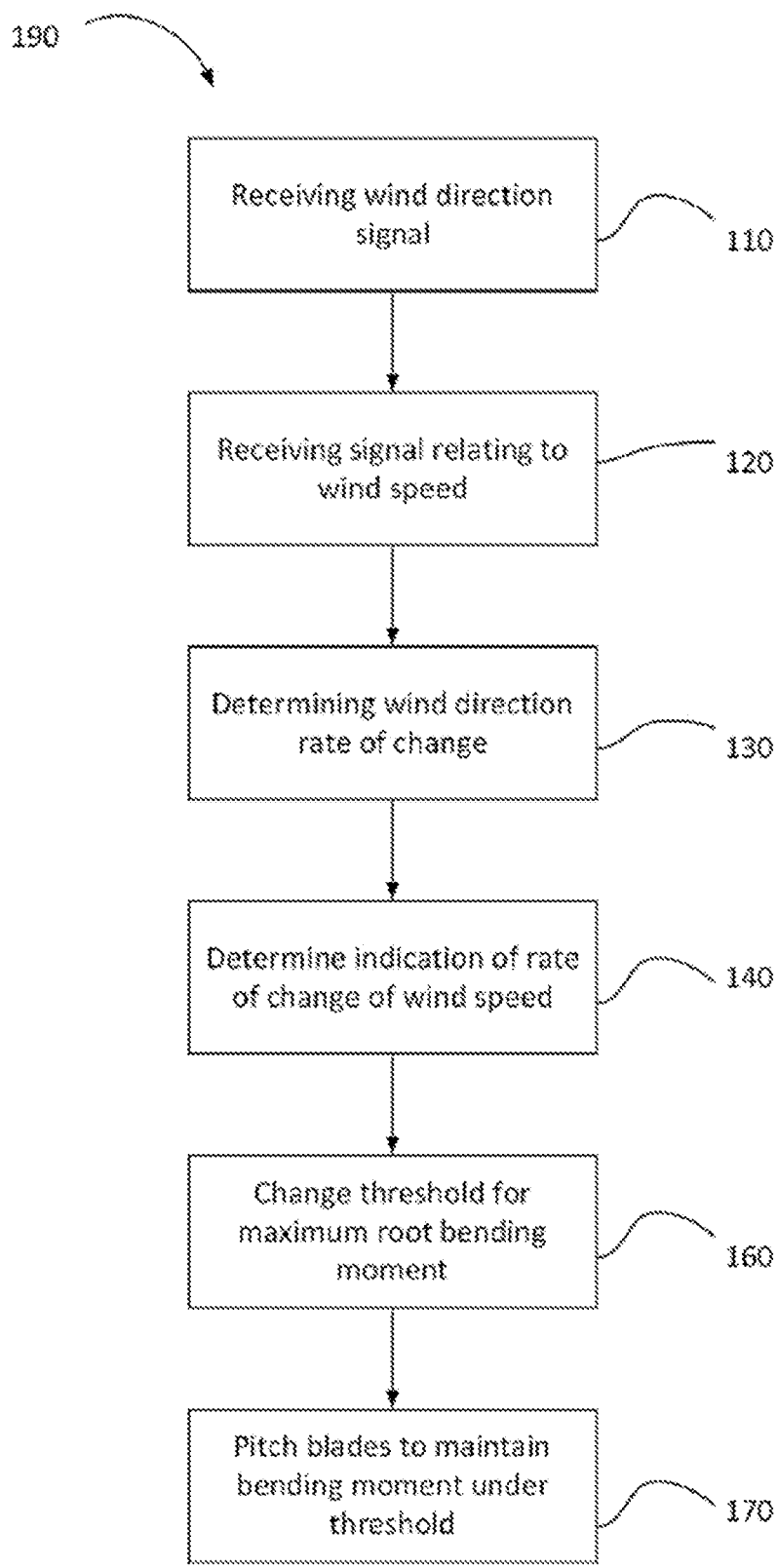
FIG. 3B illustrates another example of a control method according to the present disclosure.

FIG. 3B illustrates an alternative example of a control method. Since blocks 110, 120, 130 and 140 are the same as for the example of FIG. 3A, reference may be had to the description of these blocks hereinbefore.

In the example of FIG. 3B, based on the determined rate of change of wind direction, at block 130, and the determined rate of change of the indicator of wind speed (which may again be e.g. rotor speed or wind speed itself) at block 140, a threshold for a maximum bending moment on one or more of the blades is changed, at block 160. The maximum bending moment may be a maximum bending moment in the root of one or more of the blades.

Operation of the pitch system may generally be dictated by rotor speed measurements, and therewith may be based on wind speed. An additional constraint may be implemented in the pitch control which is to limit loads on the blades. The load constraint may be a maximum (root) bending moment. The pitch system may thus react to reduce the angle of attack of one or more of the blades to maintain the bending moment under the maximum bending moment threshold. The bending moment during operation may be derived e.g. from flapwise and edgewise load sensors.

One example of reacting to the identification of a specific load case may therefore be to reduce the maximum allowable (root) bending moment, so that a pitch control system is quicker to react. At block 170, the blades may be pitched so as to maintain the actual bending moment under the threshold value. In examples therefore, the control signal(s) for the pitch system(s) may be determined based on one or more measurements of loads on one or more blades of the wind turbine.

In examples, a setpoint may be determined based on a comparison between a (root) bending moment on one or more of the blades and a maximum (root) bending threshold. The control signals for the pitch system may include the maximum (root) bending threshold In specific examples, the maximum root bending threshold may be adjusted when the rate of change of wind speed is above an acceleration threshold. Specifically, the acceleration threshold may be a function of the rate of change of the wind direction.

Figure 3C:
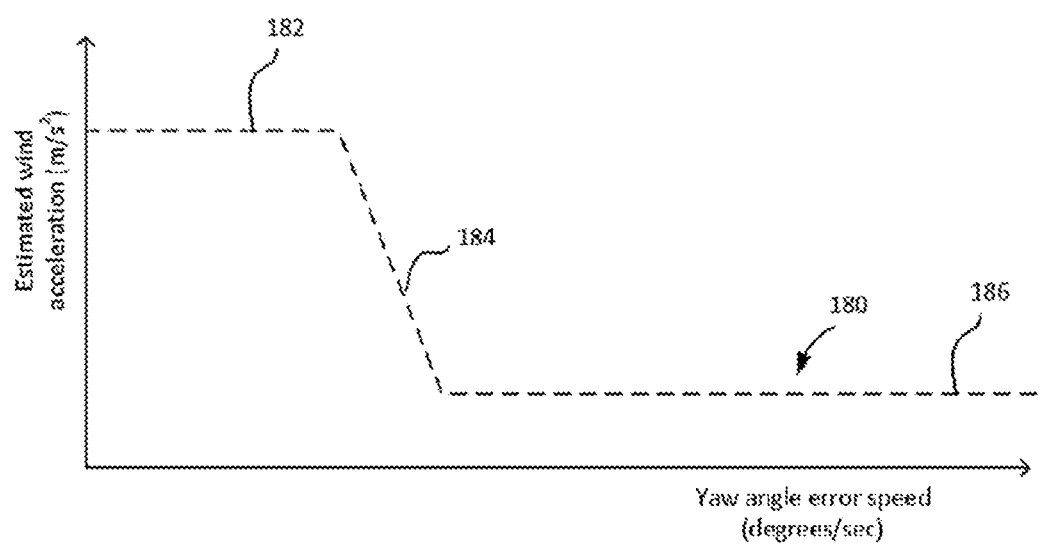
FIG. 3C illustrates how a wind acceleration threshold may be determined in methods according to the present disclosure.

FIG. 3C illustrates when the lowering of a bending threshold may be triggered. A wind acceleration threshold 180 may be defined as a function of the rate of change of wind direction. In this specific example, the wind direction speed is in this case embodied as a rate of change of a yaw misalignment angle. And it should be clear that alternatively to wind acceleration, rotor acceleration might be used.

The wind acceleration threshold may be fixed at a first level 182 for a first level of yaw misalignment rate. For a second range of yaw misalignment rate, the wind acceleration threshold may decrease substantially linearly along segment 184. And a second wind acceleration threshold 186 may be established for higher levels of yaw misalignment rate.

When a combination of yaw misalignment rate and wind acceleration at the right hand side of the threshold 180 (or above the threshold) is found, a maximum allowed bending moment of the blades may be reduced. Such a reduction of the maximum bending moment may be implemented by lowering a specific amount, a specific percentage and/or at a specific rate. When a combination of yaw misalignment and wind acceleration at the left hand side of the threshold 180 or below the threshold is found, the maximum allowed bending moment is maintained at a normal, steady state, level.

More conservative approaches may be taken to protect the wind turbine from high loads, and more aggressive approaches may be taken in an attempt to maximize energy or power output of the wind turbine by selecting an alternative threshold 180. Ideally, the wind acceleration threshold may be chosen such that the wind turbine implements an alternative control strategy when necessary (e.g. when a DLC 1.4 load case actually occurs) and maintains normal control when such a load case does not occur.

While in this example, a wind (or rotor) acceleration threshold 180 is defined as a function of rate of change of wind direction, and a bending moment threshold is changed when the wind (or rotor) acceleration is above the threshold, it should be clear that this may alternatively be regarded vice versa. That is, a threshold for a rate of change of wind direction may be defined as a function of wind (or rotor) acceleration, and the bending moment threshold for the blades may be lowered when the rate of change of wind direction is higher than allowed.

Implementing the reaction to a combination of wind direction change and wind speed change by lowering a bending moment threshold has been found to be a particularly effective manner to maintain power output as much as possible (pitching only occurs if necessary in view of the loads), and to react sufficiently rapidly to maintain loads under control without damaging wind turbine components.

Bending loads at the bottom of the tower were found to be reduced by 5-10% depending on the specific wind scenario. Similarly, blade root bending moments were reduced by similar amounts. At the same time, by controlling the pitch of the blades to maintain loads under control, (unnecessary) pitch activity was reduced, particularly at wind speeds close to rated or nominal wind speed.

In a further aspect, a control system for a wind turbine is provided, which is configured to carry out any of the methods disclosed herein. The control system may be a wind turbine central controller separate from a pitch control system or the control system may be a combination of a wind turbine central controller and a pitch control system.

A control system for a wind turbine may be configured to receive a wind direction signal indicative of an instantaneous wind direction at a wind turbine and receive one or more signals indicative of an instantaneous wind speed at the wind turbine. The control system may further be configured to determine a rate of change of the wind direction at the wind turbine and an indication of a rate of change of wind speed at the wind turbine and to determine one or more control signals for a pitch system of the wind turbine at least partially based on the determined rate of change of the wind direction and on the determined indication of the rate of change of wind speed.

As explained before, in some examples, the control system may be configured to receive one or more signals indicative of loads on blades of the wind turbine, and to determine a control signal for the pitch system based on the loads on the blades.

In specific examples, the control system may be configured to determine the control signal(s) based on a comparison between a bending moment on the blades with a maximum bending moment threshold, and the maximum bending moment threshold may be determined as a function of the rate of change of the wind direction and the rate of change of the wind speed.

In yet a further aspect, the present disclosure provides a wind turbine comprising a tower, a nacelle rotatably mounted on the tower, and such a control system. The wind turbine may include a yaw system for rotating the nacelle around a longitudinal axis of the tower. As mentioned before, in some examples, the yaw misalignment may be used for deriving a rate of change of the wind direction.

In examples, the wind turbine may comprise a vane anemometer for providing the signal indicative of an instantaneous wind direction at the wind turbine to the control system. In other examples, the wind turbine may comprise a LIDAR, and the wind condition (wind speed, wind turbulence, or other) may be derived from measurements of the LIDAR system. In yet further examples, wind measurements may be provided from a remote measurement system like a met mast. A LIDAR may be able to determine different wind directions at different heights. In case of a variation of wind direction over the rotor swept area ("wind veer"), an average or mean wind direction may be determined.

In some examples, the wind speed may be determined based on one or more of a power output of the wind turbine, a rotor speed, and a pitch angle of one or more wind turbine blades. Power output, rotor speed and pitch angle are control variables that are routinely measured or controlled in wind turbines. From the combination of these variables, a wind condition like wind speed can be calculated. In further examples, loads experienced by the wind turbine may be measured to determine the wind condition.

Figure 4:
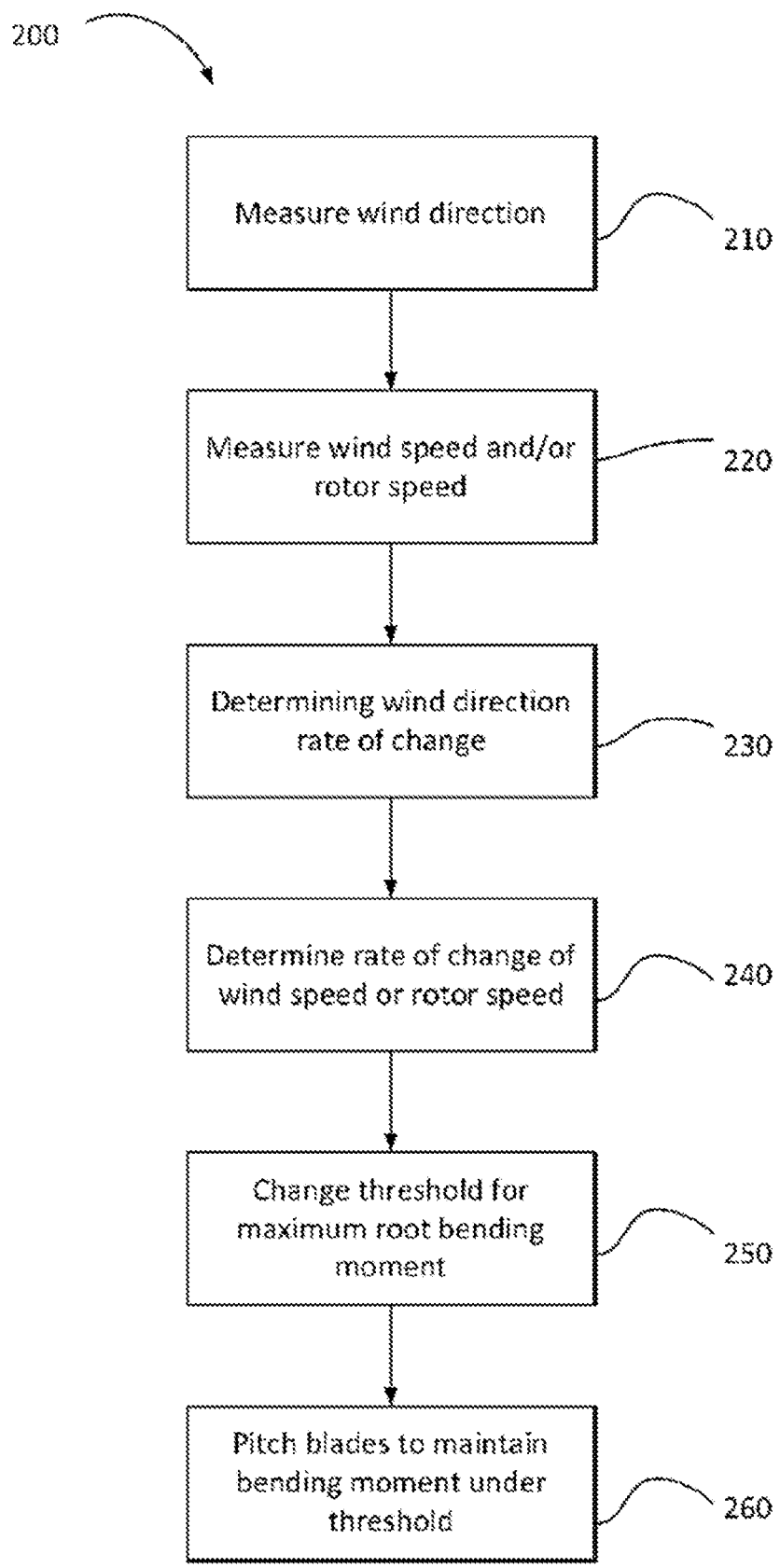
FIG. 4 schematically illustrates a method for operating a wind turbine according to an example of the present disclosure.

In yet a further aspect, a method for operating a wind turbine is provided. An example of a method 200 for operating a wind turbine is illustrated in FIG. 4. The method comprises measuring, at block 210, a wind direction. The method further comprises, at block 220, measuring wind speed at the wind turbine and/or rotor speed of the wind turbine.

The method further comprises, at block 230, determining a rate of change of the wind direction at the wind turbine and, at block 240, determining a rate of change of a wind speed and/or rotor speed at the wind turbine. The method further comprises reducing loads on the wind turbine when the rate of change of the wind speed or rotor speed is above an acceleration threshold. The acceleration threshold may be based at least partially on the rate of change of the wind direction.

As was mentioned before with reference to FIGS. 3A and 3B, the order of some of the steps or blocks may be interchanged. The method 200 may be carried out substantially continuously throughout operation of the wind turbine.

In the illustrated example, reducing loads on the wind turbine is implemented by changing a threshold for a maximum (root) bending moment, at block 250. The blades may be pitched, at block 260, to maintain the (root) bending moment under the established maximum bending moment.

In some examples, the maximum bending moment threshold may be lowered when the rate of change of wind speed or rotor speed is above the acceleration threshold.

In some examples, reducing the loads on the wind turbine comprises pitching blades of the wind turbine at a pitch rate that is higher than a normal pitch rate.

In some examples, measuring the wind direction at the wind turbine may comprise measuring the wind direction using a nacelle mounted wind vane. Alternative for the use of a wind vane have been discussed already throughout the present disclosure.

Those of skill in the art would further appreciate that the various illustrative logical blocks, modules, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application.

The various illustrative logical blocks, modules, and algorithms described in connection with the disclosure herein may be implemented or performed with one or more general-purpose processors, a digital signal processor (DSP), cloud computing architecture, an application specific integrated circuit (ASIC), a field programmable gate array (FPGA), programmable logic controller (PLC) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The present disclosure also relates to computing systems adapted to carry out any of the methods disclosed herein.

The present disclosure also relates to a computer program or computer program product comprising instructions (code), which when executed, performs any of the methods disclosed herein.

The computer program may be in the form of source code, object code, a code intermediate source and object code such as in partially compiled form, or in any other form suitable for use in the implementation of the processes. The carrier may be any entity or device capable of carrying the computer program.

If implemented in software/firmware, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD/DVD or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software/firmware is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Although only a number of examples have been disclosed herein, other alternatives, modifications, uses and/or equivalents thereof are possible. Furthermore, all possible combinations of the described examples are also covered. Thus, the scope of the present disclosure should not be limited by particular examples but should be determined only by a fair reading of the claims that follow.

The invention claimed is:

1. A method for controlling a wind turbine comprising:
   receiving a wind direction signal indicative of an instantaneous wind direction at the wind turbine;
   receiving one or more signals indicative of an instantaneous wind speed at the wind turbine;
   determining a rate of change of the wind direction at the wind turbine and a rate of change of wind speed at the wind turbine;
   determining one or more control signals for a pitch system for blades of the wind turbine at least partially based on the rate of change of the wind direction and the rate of change of wind speed; and
   changing the pitch of the blades with the pitch system based on the control signals to reduce loads on the wind turbine from changes in the wind direction simultaneous with changes in the wind speed.

2. The method of claim 1, wherein the control signals for the pitch system include a specific pitch rate.

3. The method of claim 1, wherein the control signals include a setpoint for the pitch system based on a comparison between an indicated maximum load for the blades of the wind turbine and a measured load on one or more of the blades.

4. The method of claim 1, wherein the signals indicative of the instantaneous wind speed are rotor speed measurements.

5. The method of claim 4, wherein the signals indicative of the instantaneous wind speed are derived from a power output of the wind turbine and a pitch angle of the blades.

6. The method of claim 1, wherein the signals indicative of an instantaneous wind speed are derived from a nacelle mounted wind measurement system.

7. A method for controlling a wind turbine comprising:
   receiving a wind direction signal indicative of an instantaneous wind direction at the wind turbine;
   receiving one or more signals indicative of an instantaneous wind speed at the wind turbine;

determining a rate of change of the wind direction at the wind turbine and a rate of change of wind speed at the wind turbine;

determining one or more control signals for a pitch system for blades of the wind turbine at least partially based on the rate of change of the wind direction and the rate of change of wind speed;

changing the pitch of the blades with the pitch system based on the control signals to reduce loads on the wind turbine from changes in the wind direction simultaneous with changes in the wind speed;

wherein the control signals include a setpoint for the pitch system based on a comparison between an indicated maximum load for the blades of the wind turbine and a measured load on one or more of the blades; and wherein the setpoint for the pitch system is determined based on a comparison between a bending moment on one or more of the blades and a maximum bending threshold.

8. The method of claim 7, wherein the maximum bending threshold is adjusted when the rate of change of wind speed is above an acceleration threshold.

9. The method of claim 8, wherein the acceleration threshold is a function of the rate of change of the wind direction.

10. A control system for a wind turbine, the control system configured to:

receive a wind direction signal indicative of an instantaneous wind direction at a wind turbine;

receive one or more signals indicative of an instantaneous wind speed at the wind turbine;

determine a rate of change of the wind direction at the wind turbine and a rate of change of wind speed at the wind turbine;

determine one or more control signals for a pitch system for blades of the wind turbine based on the rate of change of the wind direction and the rate of change of the wind speed; and change the pitch of the blades with the pitch system based on the control signals to reduce loads on the wind turbine from changes in the wind direction simultaneous with changes in the wind speed.

11. The control system of claim 10, wherein the control signals include a setpoint for the pitch system based on a comparison between an indicated maximum load for the blades of the wind turbine and a measured load on one or more of the blades.

12. A wind turbine, comprising:

a tower;

a nacelle rotatably mounted on the tower; and the control system of claim 10.

13. The wind turbine of claim 1, further comprising a wind vane that provides the signal indicative of the instantaneous wind direction at the wind turbine.

14. The wind turbine of claim 12, further comprising a nacelle mounted anemometer that provides the signal indicative of the instantaneous wind speed at the wind turbine.

15. A control system for a wind turbine, the control system configured to:

receive a wind direction signal indicative of an instantaneous wind direction at a wind turbine;

receive one or more signals indicative of an instantaneous wind speed at the wind turbine;

determine a rate of change of the wind direction at the wind turbine and a rate of change of wind speed at the wind turbine;

determine one or more control signals for a pitch system for blades of the wind turbine based on the rate of change of the wind direction and the rate of change of the wind speed; and change the pitch of the blades with the pitch system based on the control signals to reduce loads on the wind turbine from changes in the wind direction simultaneous with changes in the wind speed;

wherein the control signals include a setpoint for the pitch system based on a comparison between an indicated maximum load for the blades of the wind turbine and a measured load on one or more of the blades; and wherein the setpoint for the pitch system is determined based on a comparison between a bending moment on one or more of the blades and a maximum bending moment threshold, wherein the maximum bending moment threshold is determined as a function of the rate of change of the wind direction and the rate of change of the wind speed.

16. A method for operating a wind turbine, comprising:

measuring a wind direction at a wind turbine and determining a rate of change of the wind direction at the wind turbine;

determining a rate of change of a wind speed or rotor speed at the wind turbine;

reducing loads on the wind turbine when the rate of change of the wind speed or rotor speed is above an acceleration threshold;

wherein the acceleration threshold is based at least partially on the rate of change of the wind direction such that the loads on the wind turbine from changes in the wind direction acting simultaneously with changes in the wind speed are reduced.

17. The method of claim 16, comprising pitching one or more blades of the wind turbine in order to keep a bending moment on the blades below a maximum bending moment threshold.

18. The method of claim 17, wherein the blades are pitched at a pitch rate that is higher than a normal pitch rate.

19. The method of claim 16, wherein measuring the wind direction at the wind turbine comprises measuring the wind direction using a nacelle mounted wind vane.

20. A method for operating a wind turbine, comprising:

measuring a wind direction at a wind turbine and determining a rate of change of the wind direction at the wind turbine;

determining a rate of change of a wind speed or rotor speed at the wind turbine;

reducing loads on the wind turbine when the rate of change of the wind speed or rotor speed is above an acceleration threshold;

wherein the acceleration threshold is based at least partially on the rate of change of the wind direction;

pitching one or more blades of the wind turbine in order to keep a bending moment on the blades below a maximum bending moment threshold; and wherein the maximum bending moment threshold is lowered when the rate of change of wind speed or rotor speed is above the acceleration threshold.

\* \* \* \* \*